W. A. ROCKLIFF & J. W. BOOTH.
FUME ARRESTER.
APPLICATION FILED JAN. 27, 1909.
922,516.
Patented May 25, 1909.
3 SHEETS—SHEET 2.
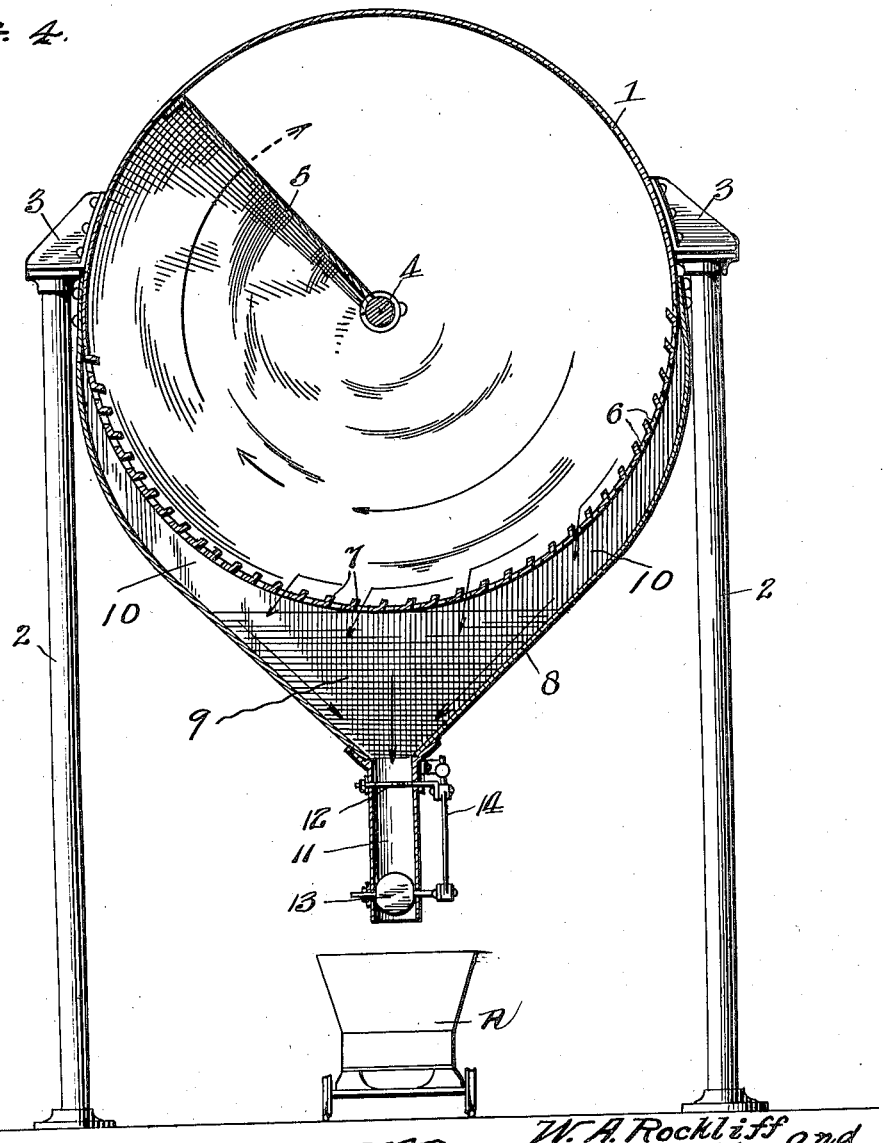
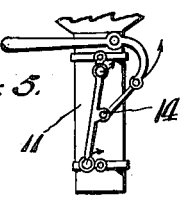

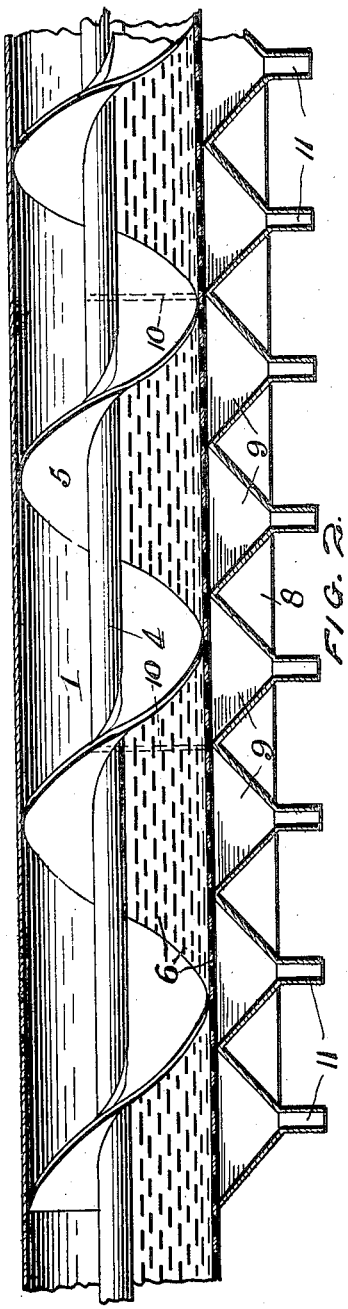
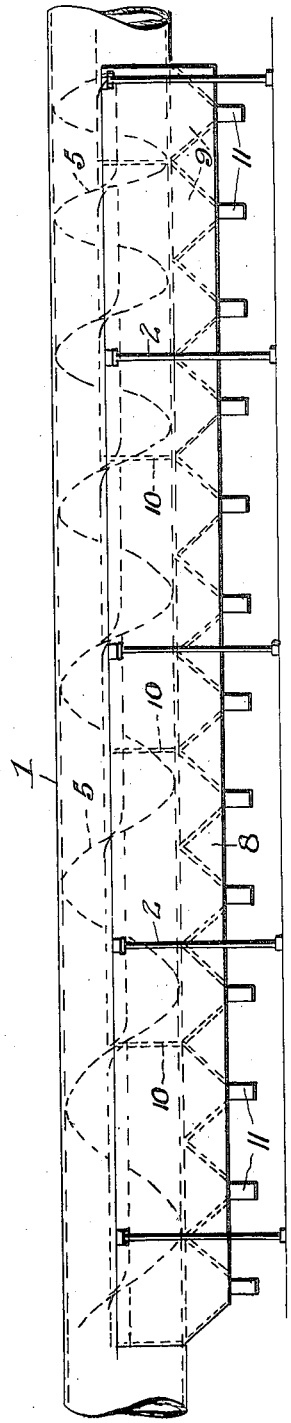
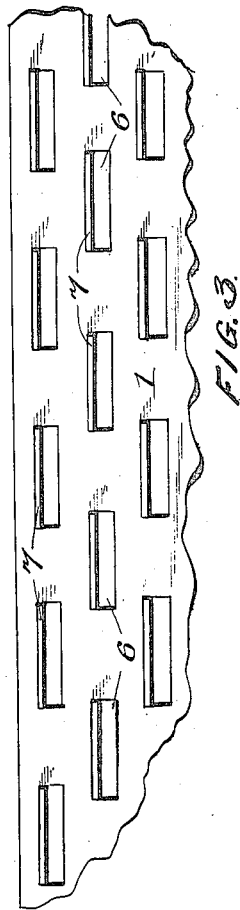

W. A. ROCKLIFF & J. W. BOOTH.
FUME ARRESTER.
APPLICATION FILED JAN. 27, 1909.
922,516.
Patented May 25, 1909.
3 SHEETS—SHEET 3.
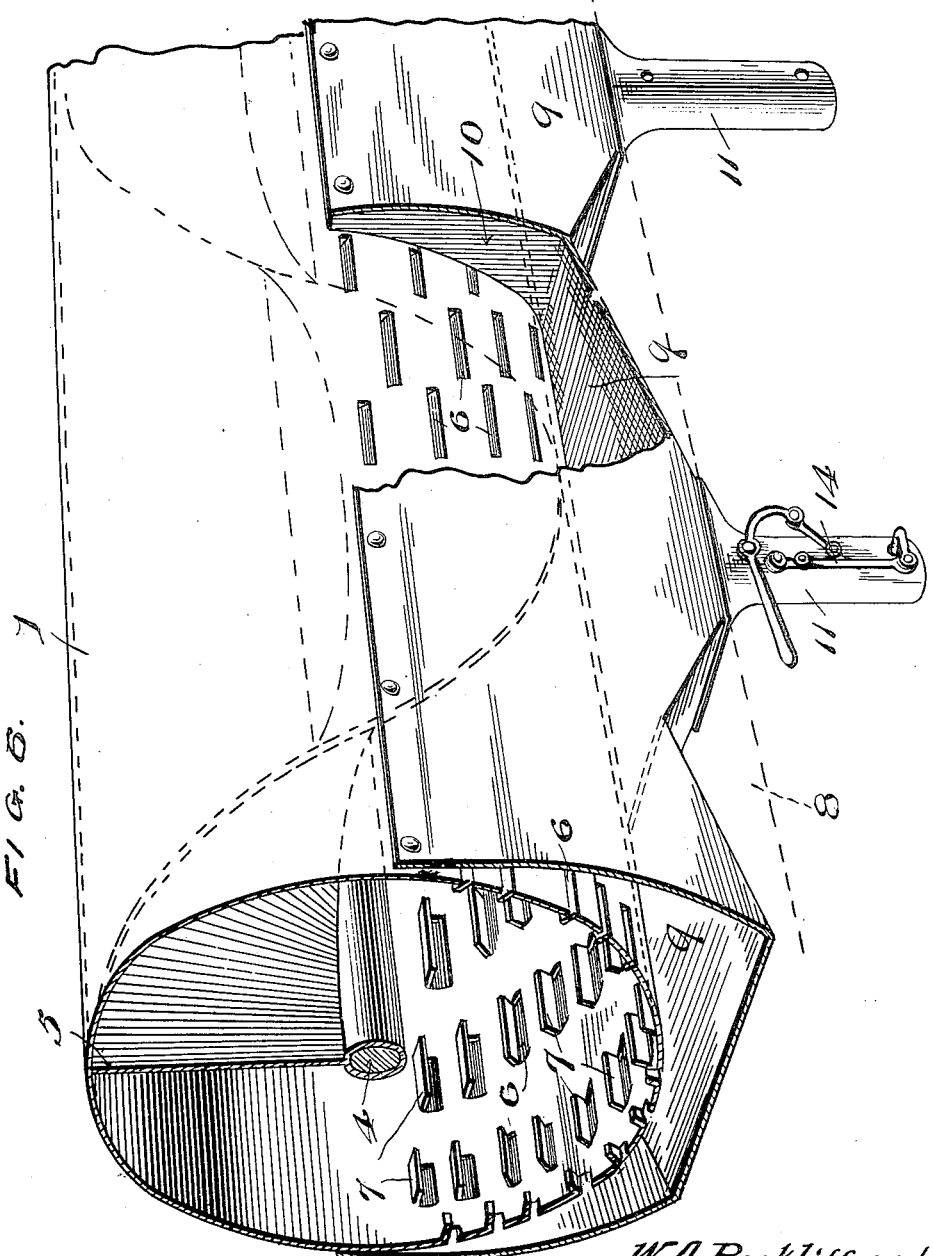

UNITED STATES PATENT OFFICE.

WILLIAM A. ROCKLIFF AND JOHN W. BOOTH, OF SALT LAKE CITY, UTAH.

FUME-ARRESTER.

No. 922,516.   Specification of Letters Patent.   Patented May 25, 1909.

Application filed January 27, 1909. Serial No. 474,459.

*To all whom it may concern:*

Be it known that we, WILLIAM A. ROCK-LIFF and JOHN W. BOOTH, citizens of the United States, residing at Salt Lake City, in the county of Salt Lake and State of Utah, have invented certain new and useful Improvements in Fume-Arresters, of which the following is a specification.

Our invention relates to gas flues, and more particularly to a flue adapted to separate and purify the gas as it passes therethrough, and the object of our invention is to provide an economical and efficient apparatus for separating the solids from gases produced by blast, reverberatory and roasting furnaces, and one which will be capable of handling the gases in large or small volumes, and at high or low temperatures, thus permitting of the recovery of suspended particles of value in the gases, after the roasting or smelting of gold, silver, copper and other precious metals.

A further object is to provide such an apparatus, capable of removing from the gas passing therethrough, poisonous and other objectionable matter carried into suspension by the gases, thus permitting of the filtering of gases required for use in gas engines, from iron and steel furnaces, and also the purification of gases from furnaces or roasters handling sulfur-containing ores, where it is desired to use the gas in the subsequent manufacture of sulfuric acid.

Further objects and advantages of our present invention will become apparent to those skilled in the art from the following description, in which reference is made to the accompanying drawings, illustrating our invention, and forming a part of this specification, and in which, Figure 1 is a side elevation of our complete apparatus. Fig. 2 is a longitudinal sectional view taken therethrough. Fig. 3 is a view on an enlarged scale of a fragmentary portion of the slotted gas tube casing. Fig. 4 is a vertical transverse sectional view taken through the apparatus and on an enlarged scale. Fig. 5 is a side view of one of the discharge tubes, illustrating its valve mechanism, and Fig. 6 is a sectional perspective view of the casing, partly broken away, to illustrate one of the partition plates 10.

In the embodiment of our invention as shown, we provide an elongated cylindrical casing 1, through which the gases from furnaces or the like are driven. The casing 1 is supported in a horizontal elevated position by spaced vertical supporting posts 2, secured to the outer surface of said casing 1, above its horizontal center by plates 3, thus rigidly holding said casing 1 in position, as is also rigidly held a central shaft 4, passing longitudinally through said casing, and provided with a deflector plate 5 extending in a longitudinal spiral between itself and the inner surface of said casing 1, throughout the length of the latter.

By particular reference to Fig. 1, it will be seen that the convolutions of the deflector plate 5 gradually increase in the direction of the flow of the gases, it being understood that the gases flow from the left to the right in said figure. In other words, the distances between the convolutions of the spiral deflector plate 5, are decreased gradually in the direction of the flow of the gases, whereby to throw the volume of gas against the wall of the casing 1, in a centrifugal motion of gradually increasing force. The portion of the wall of the casing 1, below its horizontal diametrical center, and throughout the length of the said casing, is provided with portions of its material struck up inwardly therefrom, to form openings therethrough, and flanges at the sides of said openings, extending at an inclined angle toward the volume of gas, as will be seen by reference to Fig. 4, in which the arrows indicate the travel of the gases.

Secured longitudinally along the lower portion of the casing 1, and at its side edges thereto, to span the portion thereof provided with the aforementioned openings 6 and flanges 7, is a deposit receiving casing 8, embodying a longitudinal series of hopper-like portions 9, and equidistantly spaced partition plates 10, extending between the same and the casing 1, to destroy the influence of the gases within said casing 1, upon the deposit thereof. Each of the hopper-like portions 9 of the deposit receiving casing 8, is provided at its base, with a depending discharge tube 11, having upper and lower valves 12 and 13 therein, provided with connections 14 whereby they may be simultaneously operated to effect the discharge of the deposit within said hopper-like portion, and prevent the inrush of air during such discharge.

From the foregoing it will be seen that the volume of gas passing through the cylindrical casing 1, will be given spiral movement by virtue of the deflector plate 5, causing the suspended particles thereof to be centrifugally thrown against the wall of said casing, and intercepted by the flanges 7 and caused by the same to pass through openings 6 into the deposit receiving casing 8, where the deposit is collected within the hopper-like portions 9 thereof, and may be withdrawn through the discharge tube 11 into a suitable receptacle such as a car A shown in Fig. 4. It will be further seen that the disturbing influence of the gas volume within the casing 1 is excluded from the deposit casing 8, by the partition plate 10, separating the same into chambers, and preventing circulation of the gases therethrough.

While it is not essential that the convolutions of the spiral deflector plate 5 should be increased as described, we have found such a construction to be productive of greatly beneficial results.

Having fully described our invention, we claim:

1. In a gas flue of the character described, the combination of a casing through which the gases pass, having a perforated wall, a receiving casing for the solids, extending longitudinally of said first named casing, and surrounding its perforated wall, and provided with valved outlets, and a spiral deflector plate arranged longitudinally within said first named casing, the convolutions of which gradually increase in pitch in the direction of the flow of the gases, substantially as described.

2. In a gas flue of the character described, the combination of a casing through which the gases pass, having a perforated wall, a receiving casing for the solids, extending longitudinally of said first named casing, surrounding its perforated wall, partition plates separating said receiving casing into receiving chambers to prevent the disturbing influences of the gases therein, said receiving casing having valved outlets in its said chamber, and a spiral deflector plate arranged longitudinally within said first named casing, substantially as described.

3. In a gas flue of the character described, the combination of a casing through which the gases pass, having a perforated wall, a receiving casing for the solids extending longitudinally of said first named casing, and surrounding its perforated wall, partition plates separating said receiving casing into receiving chambers, to prevent a disturbing influence of the gases therein, said receiving casing having valved outlets in its said chamber, and a spiral deflector plate arranged longitudinally within said first named casing, the convolutions of which gradually increase in pitch in the direction of the flow of the gases, substantially as described.

4. In a gas flue of the character described, the combination of an elevated cylindrical casing, through which the gases pass, having the lower circumferential portion of its wall provided with openings extending therethrough, a spiral deflector plate arranged longitudinally within said casing, the convolutions of which gradually increase in pitch in the direction of the flow of the gases, to cause centrifugal movement thereof, against the wall of said casing, in gradually increasing force, and a receiving casing extending longitudinally of said gas casing, and secured thereto to span the portion of its wall having the said openings, and provided with valved outlets, substantially as described.

5. In a gas flue of the character described, the combination of an elevated cylindrical casing through which the gases pass, having the lower circumferential portion of its wall provided with openings extending therethrough, a spiral deflector plate arranged within said casing to cause centrifugal movement of the gases against the wall thereof, a receiving casing extending longitudinally of said gas casing and secured thereto to span a portion of its wall having the said openings, partition plates separating said receiving casing into receiving chambers, to prevent a disturbing influence of the gases therein, said receiving chambers having valved outlets for the solids, substantially as described.

6. In a gas flue of the character described, the combination of a rigidly supported cylindrical sheet metal casing, through which the gases pass, means within said casing to cause centrifugal movement of the gases against the wall thereof, said casing being provided in the lower circumference of its cylindrical wall with portions of its material struck up inwardly therefrom to form openings therethrough, and flanges at the sides of said openings extending at an inclined angle to the gas volume, and means below said casing to receive the solid matter from the gases, provided with valved outlets, substantially as described.

In testimony whereof we affix our signatures in presence of two witnesses.

WILLIAM A. ROCKLIFF.
JOHN W. BOOTH.

Witnesses:
J. D. LAMB,
G. G. SCHLIEP.